TWO-PARTY LINE DISCRIMINATOR CIRCUIT FOR TELEPHONE SYSTEMS
Filed Feb. 3, 1958
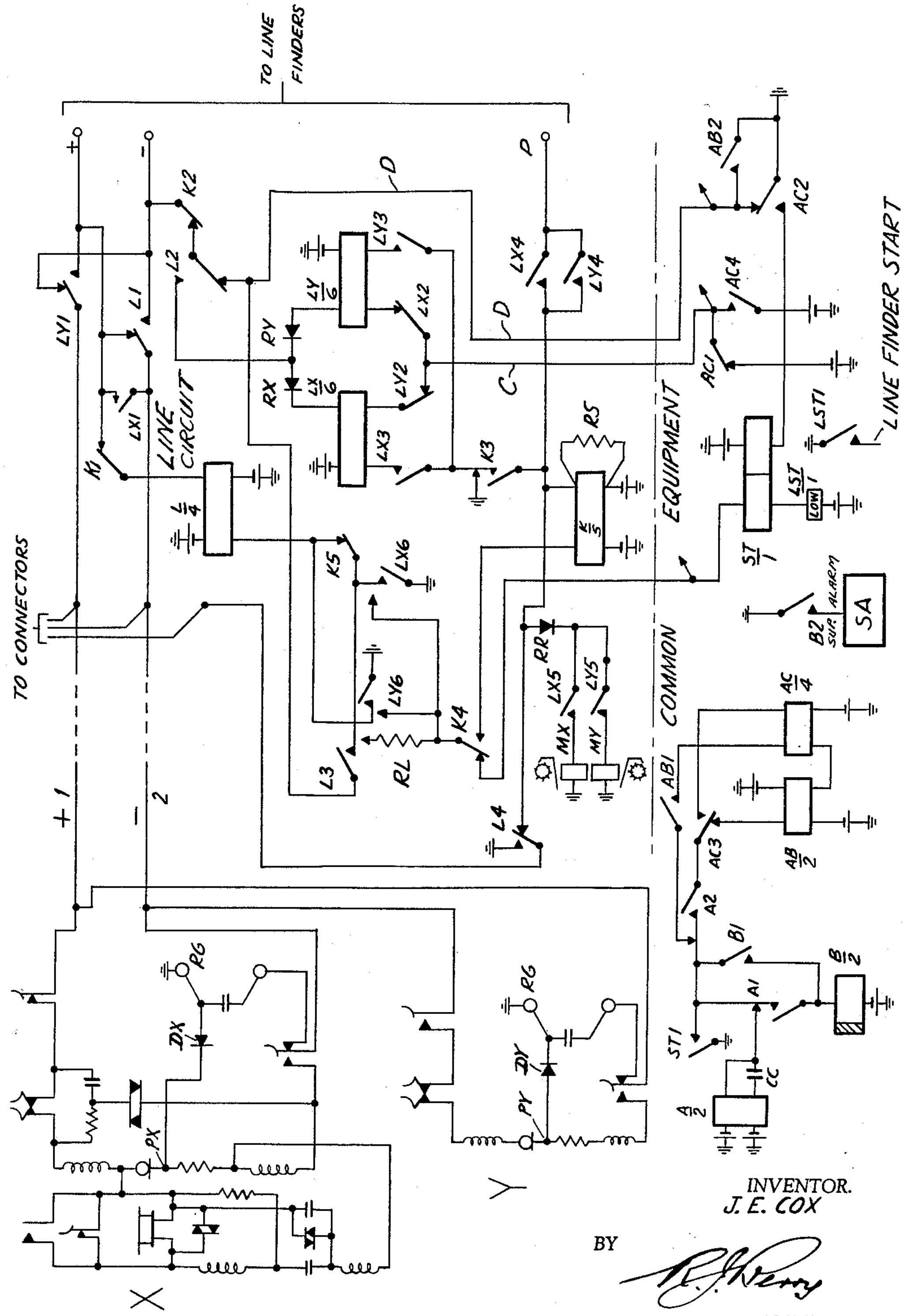
INVENTOR.
J. E. COX
BY
R. J. Perry
AGENT 3,046,343

TWO-PARTY LINE DISCRIMINATOR CIRCUIT FOR TELEPHONE SYSTEMS

John Edward Cox, Rutherford, N.J., assignor to International Telephone and Telegraph Corporation, New York, N.Y., a corporation of Maryland Filed Feb. 3, 1958, Ser. No. 713,010
4 Claims. (Cl. 179—8.5)

This invention relates to discriminator arrangements for identifying a calling subscriber on a two-party line in a telephone exchange for the purpose of actuating the meter or message register of the proper party.

In one known arrangement discrimination is achieved for charging purposes by connecting the center point of the sub-station circuit of one party to ground via its ringer coils. A disadvantage of such a method is that due to the nature of the terrain, the ground resistance may become so high that the discriminator means will not operate satisfactorily and false metering ensues, but the resistance is sufficiently low to permit operation of the subscriber's ringer. It is also suspected that the ground may sometimes be removed by a subscriber in an endeavor to evade proper charging of calls.

It is, therefore, a primary object of the present invention to provide a discriminator arrangement in which the completion of a connection is prevented if a call is attempted under such conditions and an alarm at the exchange is actuated to apprise the maintenance staff of the situation.

According to one feature of my invention the center points of both substation circuits are connected to ground via polarized conducting devices such as diodes or rectifiers, the respective conducting devices at the two stations being oppositely poled, and discriminator means is provided in the line circuit for testing the polarity of the ground at the calling station. If ground is found to be absent the call is prevented from proceeding and a delayed supervisory alarm is given.

Other objects and features of my invention will be clear from the following description of a preferred embodiment taken in conjunction with the accompanying circuit drawing which shows a party line 1, 2, having two subscriber stations X and Y connected thereto, a line circuit with its associated discriminator means and message registers and, below the broken line, certain supervisory equipment which is common to a group of line circuits.

Referring to the drawing, the substation circuits X and Y are of well-known type with the exception that the center points PX and PY are respectively connected to ground through a ringer coil RG via oppositely poled diodes or rectifiers DX and DY. Only sufficient of the substation circuit Y is shown for a proper understanding of the invention. The line circuit comprises a line relay L, cut-off relay K and two test relays LX and LY, the operating windings of which are connected in series with oppositely poled diodes RX and RY. The further arrangement of the circuits will be clear from the following detailed description of the operation of the arrangement.

When a subscriber on either station calls, a circuit is completed over the station loop for the right-hand winding of the line relay L over back contacts K1, L1, the station loop, back contacts LY1, K2, L2, AC2 to ground.

Relay L operates, holds over its left-hand winding via back contacts K5, front contacts L3 and back contacts AC2. Relay L at front contacts L4 grounds the test contacts in the connector banks to mark the calling line busy, and at front contacts L1 and L2 connects the negative side of the party line to the junction of oppositely poled diodes RX, RY. The other poles of the diodes RX and RY are connected, respectively, to the operating windings of test relays LX and LY and thence over back contacts LY3 and LX3, to conductor C.

Relay L at front contacts L3 also completed a circuit via resistor RL for the start relay ST (in the common equipment indicated below the broken line in the drawing) in series with a line finder start relay LST. LST is a low resistance relay and does not operate at this time. Start relay ST at front contacts ST1 closes a circuit for the interrupter relay A which is provided with a second bucking winding in series with condenser CC to render it slow operating. Relay A at make before break contacts A1, interrupts its own circuit and closes a circuit for slow release relay B, which locks up over front contacts B1 and ST1 and at contacts B2 grounds a lead extending to a supervisory alarm device SA. Relay A at make before break contacts A2 closes a circuit for the left-hand winding of relay AB, and during the period when relay A is pulling up a circuit is completed for the left-hand winding of relay AB. Relay AB operates. When relay A falls back the circuit is completed for the left-hand winding of relay AC in series with the right-hand winding of relay AB. When relay A again operates relay AC is held and relay AB is released. When relay A again releases relay AC is released. This cycle is repeated as long as the start relay ST is operated.

Relay AC at contacts AC1 and AC4 connects alternate negative and positive potentials, via the conductor C and contacts LY2, LX2, to the test relays LX and LY. This alternating potential finds a path to ground via diode RX or RY and the diode DX or DY in subset X or Y, depending upon which party has originated the call. If the party X is calling, relay LX operates during the application of negative potential to conductor C. If the party Y is calling, relay LY operates during the application of positive potential. Operation of either relay LX or LY disconnects at contacts LX2 or LY2 the operating winding of the other relay and locks itself over its left-hand winding and contacts LX3 or LY3 and contacts K3 of cut-off relay K.

Relay LX or LY also at contacts LX4 or LY4 connects the test wire P to the right-hand winding of cut-off relay K, at contacts LX5 or LY5 connects the correct message register MX or MY to the test wire P, and at contacts LX6 or LY6 locks relay L and starts an idle line finder (not shown) hunting for the calling line by short circuiting the resistor RL and thereby causing the line finder start relay LST to operate or by any other well known manner. When the calling line is found, relay K operates and at contacts K5 opens the holding circuit of relay L, and relay LX or LY locks to the grounded test wire P.

Provision is made whereby the operation of the relay LX or LY so connects the line wires that when ringing current is applied from a CLR trunk it is applied to the party line with the proper polarity to ring the correct party. If the relay LY is operated, and alternative holding circuit for the left-hand winding of relay L is present over front contacts LY6, and the line wires are connected straight through at front contacts LY1 and L1. If, however, the relay LX is operated, the line conductors are reversed over back contacts LY1 and front contacts LX1.

Relay K when operated locks over contacts K4 and either contacts LX6 if relay LX is operated or contacts LY6 if relay LY is operated, and relay L is held. Relay K also at contacts K4 disconnects the start relay ST which in turn at contacts ST1 opens the holding circuit of relay B and the interrupter circuit of relay A, thus terminating the cyclic operation of relays AB and AC. Upon releasing relay B at contacts B2 disconnects the alarm device SA.

After receiving the dial tone, the calling party dials the wanted number and the wanted line, if free, is rung in the usual manner. On the reply of the called subscriber, positive battery may be applied in well known manner to the test wire P to actuate the correct message register MX or MY, or any other suitable means may be employed for actuating the register. When the call is terminated, the connection is released and the removal of ground from the test wire P opens the holding circuit of relay LX or LY to insure that the identification made on the previous call is destroyed before relay K is released. Relay K releases slowly on account of the shunt resistor RS across its right hand winding. The release of relay LX, if it was operated, opens the circuit for the left-hand holding winding of relay K at contacts LX6. If relay LY was operated, upon release it opens at contacts LY6 the alternative holding circuit for the line relay L, which at contacts L3 opens the circuit via resistor RL and contact K4 for the left-hand holding winding of relay K. The line circuit is thus restored to normal condition.

When the party line is engaged by a connector, the energization of the cut-off relay K disconnects the line relay L and the other equipment from the line and ringing current is applied to the appropriate line wire to call the correct party.

The ground resistance used for party line discrimination at a station may become too high to reliably operate discriminating means at the exchange but may be low enough to permit the subscriber's ringer to operate satisfactorily. It is also possible that a subscriber may maliciously disconnect the ground thinking that he can prevent metering of the call or cause the call to be incorrectly metered to the other subscriber on the party line. In prior arrangements, under these circumstances, a call could still be made without the knowledge of the telephone company, but with the system of my invention the call is prevented from being made and an alarm is given at the exchange in the following manner.

Assuming that a ground is absent from a calling station X or Y, the line relay L operates as before and energizes the start relay ST in the common equipment which operates as already described causing the relay AC to apply alternate positive and negative potential to the conductor C. The relay B, which is locked over contacts ST1 of the start relay ST, closes at contacts B2 a circuit for a supervistory alarm device SA. Due to the absence of ground at the calling station, neither test relay LX nor LY is operated, the calling line is prevented from being seized by a line finder and the start relay ST remains actuated. The supervisory alarm device SA may be of the well-known type which actuates an audible or visual alarm signal at the end of a timed period subsequent to the closure of contacts B2 to call the attention of a maintenance man to the existence of a faulty ground condition. It will be noted that since the cut-off relay K is not operated the line relay remains locked up over contacts L3 and conductor D except during the period when AC relay only is operated.

The contacts AB2 and AC2 are provided to interrupt, once in each cycle of the relays AB and AC, the ground over conductor D to which the relay L locks. This is to give the locked up line relay L a chance to release if the line loop has been disconnected. Otherwise intermittent short circuit faults would lock up the relay L and give an alarm condition as a ground might not be available to operate relay LX or LY. To take care of this contingency the relay L is arranged to be released once per cycle as above described. The relay ST is held during this period over front contact AC2 and its right-hand winding. Thus if the line loop has been disconnected, relay L will not reoperate when relay AC releases, and the circuit will restore to normal. If the loop has not been disconnected, however, the relay L will reoperate and hold relay ST.

If it is desired to detect the presence of an unpolarized ground on a line, the circuit may be modified to cause both test relays LX and LY to operate to such a ground. Under these conditions the line finder start would be disconnected and the common equipment caused to give an alarm after a time interval, in a similar manner to that described above when an attempt is made to make a call in the absence of a ground at the substation.

While I have described above the principles of my invention in connection with specific apparatus, it is to be clearly understood that this description is made only by way of example and not as a limitation to the scope of my invention.

What is claimed is:

1. In a telephone system serving party lines having first and second stations thereon, each of said lines including two oppositely poled unidirectional conducting devices connected between respective ones of said stations and ground, means in each station responsive to a calling condition thereat for connecting the associated ground-connected device to said line, a line circuit for each of said lines, discriminator means in said line circuit, means for operating said discriminator means responsive to a calling condition at either of said stations on a line for identifying the calling one, alarm means, and means for operating said alarm means responsive to the said ground connection at any calling station being altered.

2. A telephone system as set forth in claim 1 wherein said line circuit includes means operable responsive to said alteration of the ground connection at any calling station for blocking the establishment of a connection from the calling station to any called station.

3. A telephone system as set forth in claim 1 wherein said line circuit operates responsive to a calling condition at any station served thereby and locks operated to enable the operation of said dicriminator means and whereby disconnect means is provided for unlocking said line circuit responsive to the cessation of the calling condition at the associated station.

4. A telehpone system as set forth in claim 1 wherein said alteration of the ground connection at any calling station includes the disablement of said unidirectional device to establish an unpolarized ground connection to the calling station.

References Cited in the file of this patent

UNITED STATES PATENTS

| | | |
|---|---|---|
| 1,831,385 | Hague | Nov. 10, 1931 |
| 2,820,100 | Abbott | Jan. 14, 1958 |
| 2,901,544 | Collins | Aug. 25, 1959 |